United States Patent
Yano et al.

(10) Patent No.: US 11,554,657 B2
(45) Date of Patent: Jan. 17, 2023

(54) DRIVING DEVICE

(71) Applicant: HONDA MOTOR CO., LTD., Tokyo (JP)

(72) Inventors: Keita Yano, Saitama (JP); Norikazu Kawai, Saitama (JP); Toru Ubukata, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 191 days.

(21) Appl. No.: 17/065,852

(22) Filed: Oct. 8, 2020

(65) Prior Publication Data

US 2021/0107347 A1     Apr. 15, 2021

(30) Foreign Application Priority Data

Oct. 11, 2019   (JP) .............................. JP2019-188003

(51) Int. Cl.
*B60K 6/48*     (2007.10)
*B60K 6/40*     (2007.10)

(52) U.S. Cl.
CPC .   *B60K 6/48* (2013.01); *B60K 6/40* (2013.01)

(58) Field of Classification Search
CPC .... B60W 10/08; B60W 10/11; B60W 10/111; B60W 10/113
See application file for complete search history.

(56) References Cited

U.S. PATENT DOCUMENTS

| 2001/0006919 A1 | 7/2001 | Takenaka |
| 2008/0121446 A1 | 5/2008 | Sanji |
| 2010/0125020 A1* | 5/2010 | Ikegami .................. B60L 58/12 |
| | | 475/5 |

(Continued)

FOREIGN PATENT DOCUMENTS

| CN | 101495338 A | 7/2009 |
| CN | 105848945 A | 8/2016 |

(Continued)

OTHER PUBLICATIONS

May 11, 2021, Japanese Office Action issued for related JP application No. 2019-188003.

(Continued)

*Primary Examiner* — Jeffrey J Restifo
(74) *Attorney, Agent, or Firm* — Paratus Law Group, PLLC

(57) ABSTRACT

A driving device includes: an internal combustion engine; a first rotating electric machine; a second rotating electric machine; and a transmission. The transmission includes: a first rotating electric machine shaft; a second rotating electric machine shaft which is arranged in parallel to the first rotating electric machine shaft; a first gear provided in the first rotating electric machine shaft; and a second gear provided in the second rotating electric machine shaft. A width in an axial direction of the first rotating electric machine is larger than that of the second rotating electric machine. The number of gears provided in a shaft in which a gear for the first rotating electric machine that meshes with the first gear is arranged is smaller than the number of gears provided in a shaft in which a gear for the second rotating electric machine that meshes with the second gear is arranged.

11 Claims, 3 Drawing Sheets

(56) References Cited

U.S. PATENT DOCUMENTS

| | | | | |
|---|---|---|---|---|
| 2011/0233020 | A1* | 9/2011 | Tajima | B60W 10/02 192/48.8 |
| 2012/0021861 | A1* | 1/2012 | Sakai | B60L 15/2054 903/910 |
| 2012/0329594 | A1* | 12/2012 | Sada | B60K 6/445 475/5 |
| 2013/0008284 | A1* | 1/2013 | Sada | B60K 6/40 903/902 |
| 2016/0076416 | A1* | 3/2016 | Kodama | F01M 1/02 903/904 |
| 2016/0146332 | A1* | 5/2016 | Taniguchi | F16H 57/0479 903/910 |
| 2016/0207392 | A1* | 7/2016 | Zhang | F16H 3/006 |
| 2016/0280215 | A1* | 9/2016 | Nishimine | B60W 20/15 |
| 2016/0311306 | A1 | 10/2016 | Sugiyama et al. | |
| 2017/0129323 | A1* | 5/2017 | Fremau | B60K 6/48 |
| 2017/0219085 | A1* | 8/2017 | Kiyokami | F01M 1/02 |
| 2017/0274757 | A1* | 9/2017 | Iwano | B60K 6/36 |
| 2018/0022203 | A1* | 1/2018 | Banshoya | B60K 6/445 180/65.235 |
| 2018/0201114 | A1* | 7/2018 | Oh | B60K 6/40 |
| 2019/0081537 | A1* | 3/2019 | Kiyokami | H02K 7/006 |
| 2019/0168601 | A1* | 6/2019 | Ogino | H02K 7/108 |
| 2019/0202278 | A1* | 7/2019 | Kim | B60K 6/445 |
| 2019/0291563 | A1* | 9/2019 | Ogino | F16H 3/72 |
| 2019/0315220 | A1* | 10/2019 | Liu | B60K 6/547 |
| 2019/0316654 | A1* | 10/2019 | Liu | B60K 6/36 |
| 2020/0108708 | A1* | 4/2020 | Janson | F16H 3/724 |
| 2020/0171934 | A1* | 6/2020 | Cho | B60K 6/44 |
| 2021/0024053 | A1* | 1/2021 | Kasahara | F16H 3/72 |
| 2021/0146768 | A1* | 5/2021 | Wiener | F16H 57/02 |
| 2022/0063595 | A1* | 3/2022 | Isami | B60K 6/445 |
| 2022/0126675 | A1* | 4/2022 | Beck | F16H 3/091 |
| 2022/0134863 | A1* | 5/2022 | Beck | F16H 3/089 180/65.21 |
| 2022/0134865 | A1* | 5/2022 | Beck | B60K 6/36 74/325 |
| 2022/0153123 | A1* | 5/2022 | Beck | F16H 3/12 |
| 2022/0153125 | A1* | 5/2022 | Beck | B60K 6/442 |
| 2022/0169106 | A1* | 6/2022 | Beck | B60K 6/442 |
| 2022/0176802 | A1* | 6/2022 | Forte | B60K 6/547 |

FOREIGN PATENT DOCUMENTS

| | | |
|---|---|---|
| JP | H11-240346 A | 9/1999 |
| JP | 2001-180311 A | 7/2001 |
| JP | 2010-098863 A | 4/2010 |
| JP | 2010-285062 A | 12/2010 |
| JP | 2011-133041 A | 7/2011 |
| JP | 2014-065426 A | 4/2014 |
| JP | 2015-171828 A | 10/2015 |
| JP | 2017-526571 A | 9/2017 |
| JP | 2017-222197 A | 12/2017 |
| JP | 2017-222198 A | 12/2017 |
| JP | 2018-122856 A | 8/2018 |
| JP | 2019-142296 A | 8/2019 |

OTHER PUBLICATIONS

Jun. 28, 2022, Japanese Office Action issued for related JP Application No. 2021-113656.

Oct. 8, 2022, Chinese Office Action issued for related CN Application No. 202011081444.4.

\* cited by examiner

DRIVING DEVICE

CROSS-REFERENCE TO RELATED APPLICATIONS

The present application claims the benefit of priority of Japanese Patent Application No. 2019-188003, filed on Oct. 11, 2019, the content of which is incorporated herein by reference.

TECHNICAL FIELD

The present invention relates to a driving device capable of being mounted on a vehicle.

BACKGROUND ART

In recent years, known is a hybrid vehicle on which a driving device including an engine, a motor, a generator, and a transmission is mounted (for example, JP-A-2017-222197, JP-A-2017-222198, and JP-T-2017-526571). The transmission transmits a driving force of the engine to the generator and also transmits the driving force of at least one of the engine and the motor to an axle.

SUMMARY

Since various devices other than a driving device are mounted on an engine room of a vehicle, it is desirable that the driving device is as small as possible. Particularly, in JP-A-2017-222197, JP-A-2017-222198, and JP-T-2017-526571, there is a room for improvement in a transmission configuration.

The present invention provides a driving device capable of miniaturizing a transmission.

According to an aspect of the present invention, there is provided a driving device for a vehicle, including: an internal combustion engine; a first rotating electric machine; a second rotating electric machine; and a transmission, where: the transmission includes: a first rotating electric machine shaft which is a rotating shaft of the first rotating electric machine; a second rotating electric machine shaft which is arranged in parallel to the first rotating electric machine shaft and is a rotating shaft of the second rotating electric machine; a first gear provided in the first rotating electric machine shaft; and a second gear provided in the second rotating electric machine shaft; a width in an axial direction of the first rotating electric machine is larger than a width in the axial direction of the second rotating electric machine; and the number of gears provided in a shaft in which a gear for the first rotating electric machine that meshes with the first gear is arranged is smaller than the number of gears provided in a shaft in which a gear for the second rotating electric machine that meshes with the second gear is arranged.

According to another aspect of the present invention, there is provided a driving device including: an internal combustion engine; a first rotating electric machine; a second rotating electric machine; and a transmission, where: the transmission includes: an input shaft to which a driving force from the internal combustion engine is inputted; a differential device connected to an output shaft; a counter shaft that transmits the driving force from the internal combustion engine and a driving force from the second rotating electric machine to the differential device; a first rotating electric machine shaft which is a rotating shaft of the first rotating electric machine; and a second rotating electric machine shaft which is a rotating shaft of the second rotating electric machine; the input shaft, the counter shaft, the first rotating electric machine shaft, the second rotating electric machine shaft, and the output shaft are arranged in parallel to each other; and when viewed from an axial direction, a shaft center of the input shaft and a shaft center of the counter shaft are arranged in a virtual triangle formed by connecting a shaft center of the first rotating electric machine shaft, a shaft center of the second rotating electric machine shaft, and a shaft center of the output shaft.

According to the present invention, a transmission can be miniaturized such that a driving device can be miniaturized.

DESCRIPTION OF EMBODIMENTS

Hereinafter, an embodiment of a driving device for a vehicle of the present invention will be described in detail with reference to the drawings.

[Driving Device for Vehicle]

Figure 1:
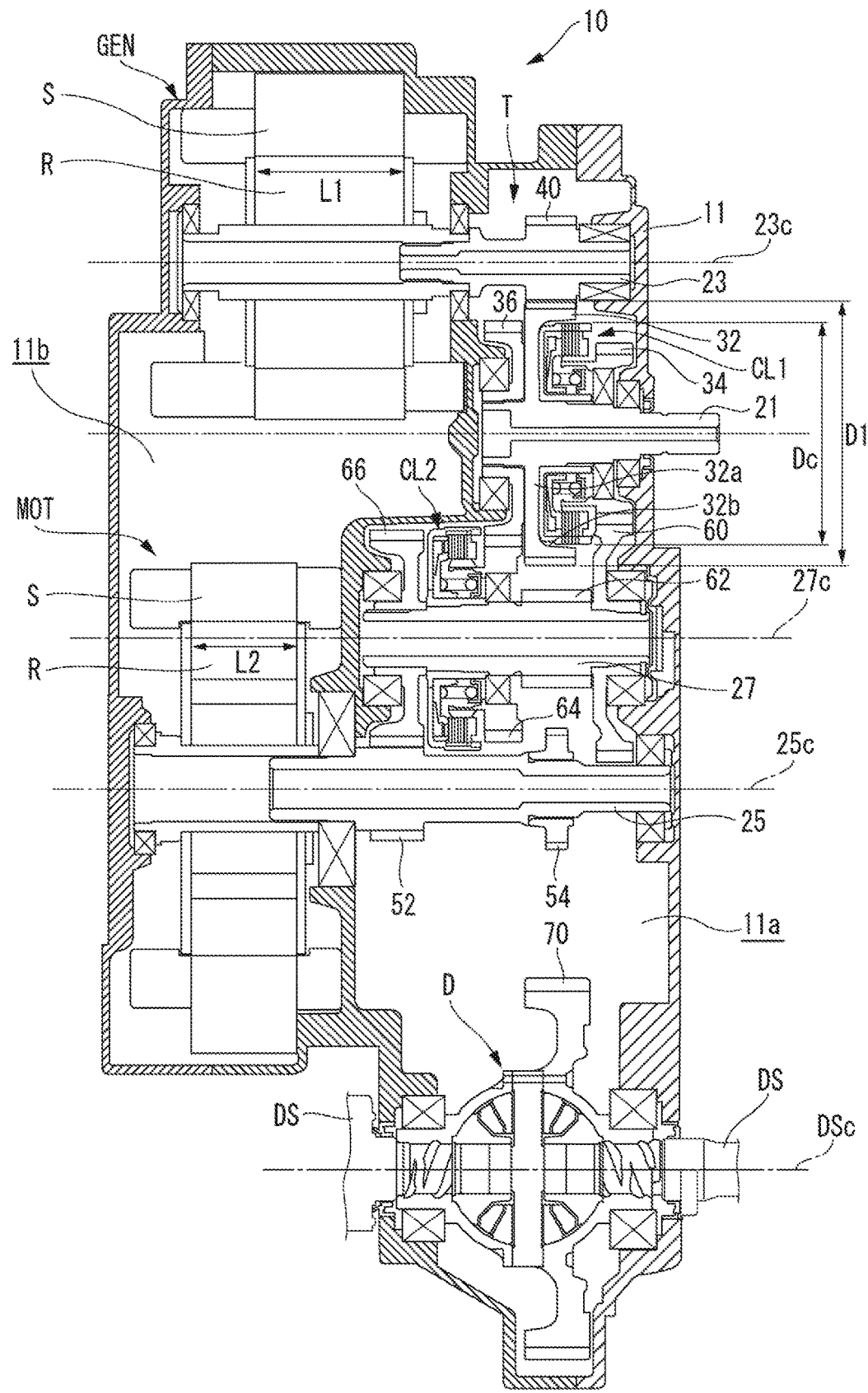
FIG. 1 is a cross-sectional view of a driving device in which the driving device according to an embodiment of the present invention is taken along an axial direction.
Figure 2:
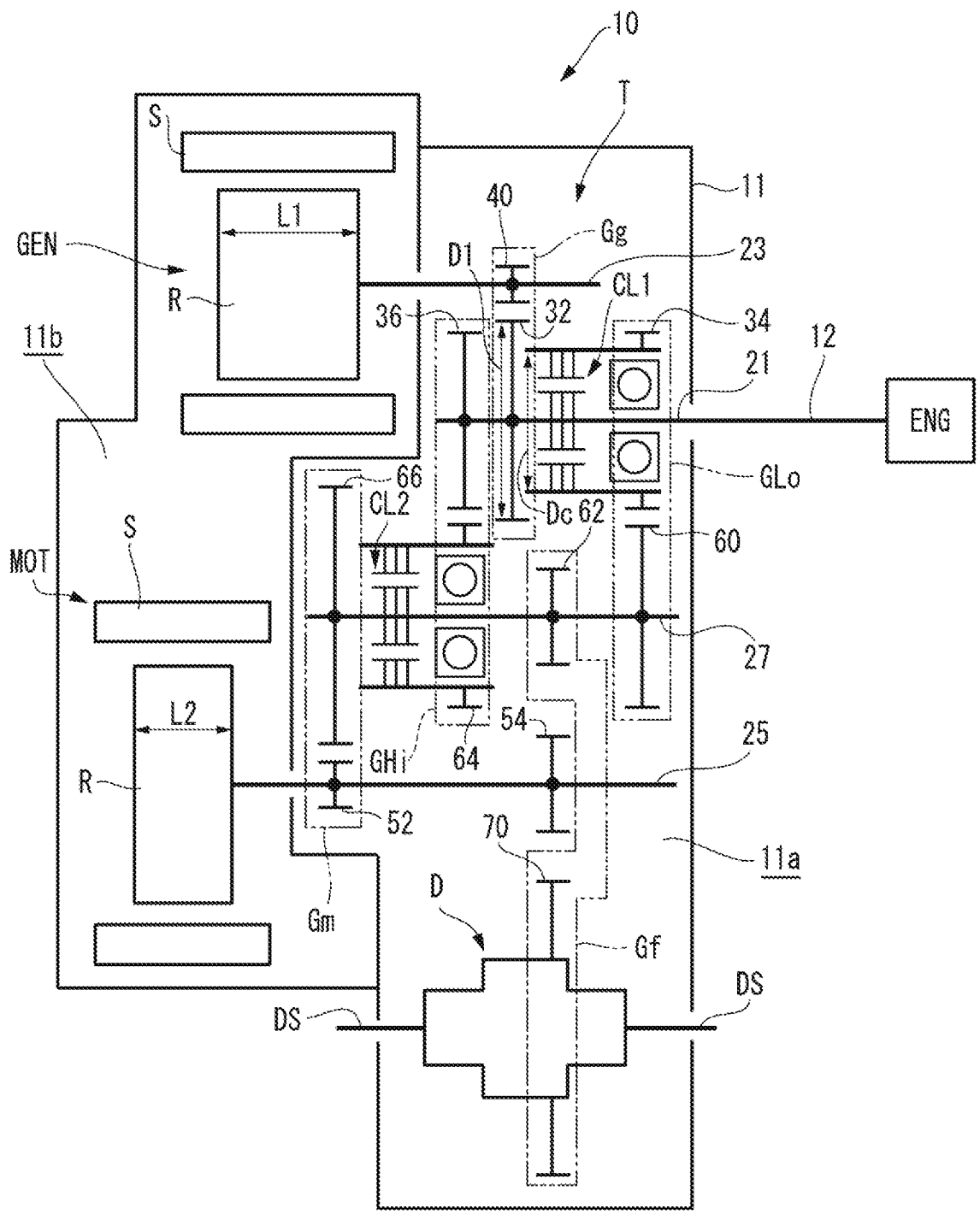
FIG. 2 is a skeleton diagram of the driving device illustrated in FIG. 1.

As illustrated in FIGS. 1 and 2, a driving device 10 includes an engine ENG, a generator GEN, a motor MOT, a transmission T, and a case 11 that houses the generator GEN, the motor MOT, and the transmission T. The motor MOT and the generator GEN are connected to a battery which is not illustrated, and are capable of supplying power from the battery and regenerating energy to the battery.

[Transmission]

The case 11 includes a transmission housing chamber 11a that houses the transmission T from the engine ENG side along an axial direction and a motor housing chamber 11b that houses the motor MOT and the generator GEN.

The transmission housing the chamber 11a houses an input shaft 21, a generator shaft 23, a motor shaft 25, a counter shaft 27, and a differential mechanism D, which are arranged in parallel to each other.

The input shaft 21 is arranged coaxially with a crankshaft 12 of the engine ENG. A driving force of the crankshaft 12 is transmitted to the input shaft 21 via a damper which is not illustrated. The input shaft 21 includes a generator drive gear 32 that forms a generator gear train Gg.

The input shaft 21 includes a low speed side drive gear 34 that forms a gear train for a low speed side engine GLo via a first clutch CL1 on the engine side with respect to the generator drive gear 32 and a high speed side drive gear 36 that forms a gear train for a high speed side engine on the side opposite to the engine side (hereinafter referred to as the motor side). The first clutch CL1 is a hydraulic clutch for detachably connecting the input shaft 21 and the low speed side drive gear 34, and is a so-called multi-plate friction type clutch.

A generator driven gear 40 that meshes with the generator drive gear 32 is provided in the generator shaft 23. The generator gear train Gg for transmitting rotation of the input shaft 21 to the generator shaft 23 is configured with the generator drive gear 32 of the input shaft 21 and the generator driven gear 40 of the generator shaft 23. The generator GEN is arranged on the motor side of the generator shaft 23. The generator GEN includes a rotor R fixed to the generator shaft 23, and a stator S fixed to the case 11 and arranged opposite to the outer diameter side of the rotor R.

The rotation of the input shaft 21 is transmitted to the generator shaft 23 via the generator gear train Gg, such that rotation of the generator shaft 23 causes the rotor R of the generator GEN to rotate. Accordingly, when the engine ENG is driven, a driving force of the engine ENG transmitted from the input shaft 21 can be always converted into electric power by the generator GEN.

The motor shaft 25 includes a motor drive gear 52 that forms a motor gear train Gm and an oil pump gear 54 in order from the motor side. In the motor shaft 25, the motor MOT is arranged closer to the motor side than the motor drive gear 52. The motor MOT is configured to include the rotor R fixed to the motor shaft 25, and the stator S fixed to the case 11 and arranged opposite to the outer diameter side of the rotor R. The oil pump gear 54 is connected to a mechanical oil pump which is not illustrated.

The counter shaft 27 includes, in order from the engine side, a low speed side driven gear 60 that meshes with the low speed side drive gear 34, an output gear 62 that meshes with a ring gear 70 of the differential mechanism D, a high speed side driven gear 64 that meshes with the high speed side drive gear 36 of the input shaft 21 via a second clutch CL2, and a motor driven gear 66 that meshes with the motor drive gear 52 of the motor shaft 25. The second clutch CL2 is a hydraulic clutch for detachably connecting the counter shaft 27 and the high speed side driven gear 64, and is a so-called multi-plate friction type clutch.

The gear train for the low speed side engine GLo for transmitting the rotation of the input shaft 21 to the counter shaft 27 is configured with the low speed side drive gear 34 of the input shaft 21 and the low speed side driven gear 60 of the counter shaft 27. The gear train for the high speed side engine GHi for transmitting the rotation of the input shaft 21 to the counter shaft 27 is configured with the high speed side drive gear 36 of the input shaft 21 and the high speed side driven gear 64 of the counter shaft 27. Here, the gear train for the low speed side engine GLo including the low speed side drive gear 34 and the low speed driven gear 60 has a reduction ratio larger than that of the gear train for the high speed side engine GHi including the high speed side drive gear 36 and the high speed side driven gear 64. Therefore, the first clutch CL1 is engaged and the second clutch CL2 is released when the engine ENG is driven, such that the driving force of the engine ENG is transmitted to the counter shaft 27 via the gear train for the low speed side engine GLo at a large reduction ratio. On the other hand, the first clutch CL1 is released and the second clutch CL2 is engaged when the engine ENG is driven, such that the driving force of the engine ENG is transmitted to the counter shaft 27 via the gear train for the high speed side engine at a small reduction ratio. The first clutch CL1 and the second clutch CL2 are not engaged with each other.

The motor gear train Gm for transmitting the rotation of the input shaft 21 of the motor shaft 25 to the counter shaft 27 is configured with the motor drive gear 52 of the motor shaft 25 and the motor driven gear 66 of the counter shaft 27. When the rotor R of the motor MOT rotates, the rotation of the input shaft 21 is transmitted to the counter shaft 27 via the motor gear train Gm. Accordingly, when the motor MOT is driven, a driving force of the motor MOT is transmitted to the counter shaft 27 via the motor gear train Gm.

A final gear train Gf for transmitting rotation of the counter shaft 27 to the differential mechanism D is configured with the output gear 62 of the counter shaft 27 and the ring gear 70 of the differential mechanism D. Therefore, the driving force of the motor MOT inputted to the counter shaft 27 via the motor gear train Gm, the driving force of the engine ENG inputted to the counter shaft 27 via the gear train for the low speed side engine GLo, and the driving force of the engine ENG inputted to the counter shaft 27 via the gear train for the high speed side engine GHi are transmitted to the differential mechanism D via the final gear train Gf, and transmitted from the differential mechanism D to an axle DS.

The driving device 10 of the embodiment configured as described above includes a power transmission path that transmits the driving force of the motor MOT to the axle DS to cause the vehicle to travel; and two power transmission paths on the low speed side and the high speed side that transmits the driving force of the engine ENG to the axle DS to cause the vehicle to travel. As a result, the vehicle on which the driving device 10 is mounted can perform so-called engine traveling, series traveling, and parallel traveling.

As illustrated in FIGS. 1 and 2, a width L1 in the axial direction of the generator GEN is larger than a width L2 in the axial direction of the motor MOT. The width L1 in the axial direction of the generator GEN and the width L2 in the axial direction of the motor MOT are width in the axial direction of each rotor R, are laminated thickness of a laminated steel plate when the rotor R is formed of the laminated steel plate, and are thickness of a sintered body when the rotor R is formed of the sintered body.

Here, the number of gears provided in the input shaft 21, which is a shaft in which the generator drive gear 32 that meshes with the generator driven gear 40 of the generator shaft 23 is arranged, is smaller than the number of gears provided in the counter shaft 27 which is a shaft in which the motor driven gear 66 that meshes with the motor drive gear 52 is arranged. More specifically, the number of gears provided in the input shaft 21 is three gears including the low speed side drive gear 34, the generator drive gear 32, and the high speed side drive gear 36, and the number of gears provided in the counter shaft 27 is four gears including the motor driven gear 66, the high speed side driven gear 64, the output gear 62, and the low speed side driven gear 60.

As such, the number of gears provided in a peripheral shaft is adjusted depending on a difference in the widths L1 and L2 in the axial direction of the generator GEN and the motor MOT, thereby making it possible to effectively use a space in the axial direction. That is, in the embodiment, since a larger number of gears are disposed in a space of a periphery of the motor MOT having a small width in the axial direction, the space can be effectively used. Therefore, the transmission T can be miniaturized, thereby making it possible to reduce the width in the axial direction of the driving device 10.

The low speed side drive gear 34 is arranged at a location closest to the engine ENG among power transmission elements provided in the input shaft 21. Since the low speed side drive gear 34 that transmits the driving force from the engine ENG to the counter shaft 27 is arranged at the location closest to the engine ENG among the power transmission elements provided in the input shaft 21, it is possible to prevent the input shaft 21 from twisting when the engine ENG is driven. The power transmission element is an element contributing to power transmission such as a gear and a clutch, and does not include a support member such as a bearing.

In the same manner, the motor drive gear 52 is arranged at a location closest to the motor MOT among power transmission elements provided in the motor shaft 25. Since the motor drive gear 52 is arranged at the location closest to the motor MOT among the power transmission elements provided in the motor shaft 25, it is possible to prevent the motor shaft 25 from twisting when the motor MOT is driven.

The motor driven gear 66 is arranged at a location closest to the motor MOT among power transmission elements provided in the counter shaft 27, and overlaps the generator GEN in the axial direction. Accordingly, the driving device 10 can be further miniaturized in the axial direction.

In the input shaft 21, the low speed side drive gear 34, the first clutch CL1, the generator drive gear 32, and the high speed side drive gear 36 are arranged in this order from the side closest to the engine ENG. An outer diameter D1 of the generator drive gear 32 is larger than an outer diameter Dc of the first clutch CL1, and the generator drive gear 32 and the first clutch CL1 partially overlap each other in the axial direction. The outer diameter D1 of the generator drive gear 32 is a tooth tip circle diameter of the generator drive gear 32, and the outer diameter Dc of the first clutch CL1 is a maximum outer diameter of the first clutch CL1.

More specifically, as illustrated in FIG. 1, the generator drive gear 32 includes a recessed portion 32b recessed to the side of the motor MOT on a side surface on the engine side of a gear disk portion 32a including a plurality of teeth in an outer peripheral portion thereof, and is arranged so that the first clutch CL1 enters the recessed portion 32b. As such, since the generator drive gear 32 and the first clutch CL1 partially overlap each other in the axial direction, the driving device 10 can be further miniaturized in the axial direction.

The second clutch CL2 may be arranged in the input shaft 21, but is arranged in the counter shaft 27 such that it is possible not only to effectively use the space of the periphery of the motor MOT having a small width in the axial direction, but also to require less clutch capacity than the case where the second clutch CL2 is arranged in the input shaft 21.

As described above, the miniaturization in the axial direction of the transmission T according to the embodiment has been described so far. The transmission T is not only miniaturized in the axial direction, but also miniaturized in an outer shape (a radial direction) viewed from the axial direction.

Figure 3:
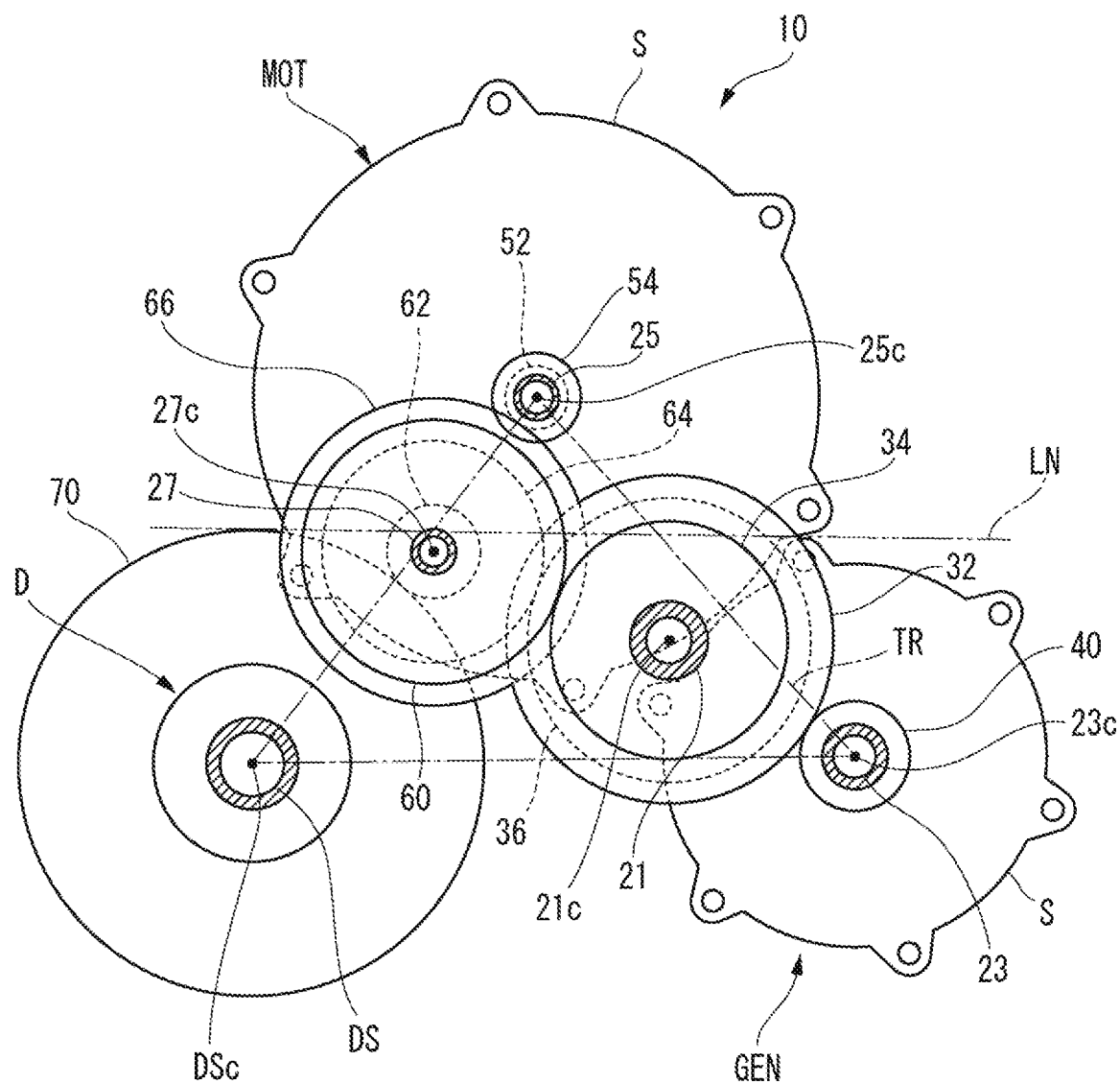
FIG. 3 is a diagram illustrating a locational relationship of each component when the driving device of FIG. 1 is viewed from a direction perpendicular to an axis.

More specifically, as illustrated in FIG. 3, when the transmission is viewed in the axial direction, an input shaft center 21c which is a shaft center of the input shaft 21 and a counter shaft center 27c which is a shaft center of the counter shaft 27 are arranged in a virtual triangle TR formed by connecting a generator shaft center 23c which is a shaft center of the generator shaft 23, a motor shaft center 25c which is a shaft center of the motor shaft 25, and an axle center DSc which is a shaft center of the axle DS. As such, since the input shaft center 21c and the counter shaft center 27c are arranged in the virtual triangle TR formed by connecting the generator shaft center 23c, the motor shaft center 25c, and the axle center DSc, the driving device 10 can be miniaturized even when viewed from the axial direction.

In the embodiment, the motor MOT is arranged upward, the generator GEN and the differential mechanism D are arranged downward, and the generator shaft center 23c and the axle center DSc are arranged at approximately the same height. The motor shaft center 25c is located closer to the side of the axle center DSc than the generator shaft center 23c, and is located closer to the side of the generator shaft center 23c than the axle center DSc. A lower portion of the motor MOT is located below a virtual line LN formed by connecting an uppermost portion of the generator GEN and an uppermost portion of the differential mechanism D. The uppermost portion of the generator GEN is an uppermost portion of a stator core of the generator GEN, and the uppermost portion of the differential mechanism D is an uppermost portion of the ring gear 70.

In other words, when viewed from the axial direction, the motor shaft center 25c is located between the generator shaft center 23c and the axle center DSc, and the motor MOT overlaps the generator GEN and the differential mechanism D in a height direction. Therefore, a height dimension of the driving device 10 can be further reduced.

As illustrated in FIG. 3, the low speed side drive gear 34 and the generator drive gear 32 partially overlap the generator GEN when viewed from the axial direction; the low speed side driven gear 60, the motor driven gear 66, and the output gear 62 partially overlap the motor MOT when viewed from the axial direction; and since the low speed side drive gear 34 and the generator drive gear 32 partially overlap the generator GEN and the motor MOT, the driving device 10 can be further miniaturized when viewed from the axial direction.

The driving device for the vehicle of the present invention is not limited to the above-described embodiment, and can be appropriately modified and improved.

(1) A driving device for a vehicle (the driving device 10), the driving device including:

an internal combustion engine (the engine ENG);

a first rotating electric machine (the generator GEN);

a second rotating electric machine (the motor MOT); and a transmission (the transmission T), in which the transmission includes a first rotating electric machine shaft (the generator shaft 23) which is a rotating shaft of the first rotating electric machine, a second rotating electric machine shaft (the motor shaft 25) which is arranged in parallel to the first rotating electric machine shaft and is a rotating shaft of the second rotating electric machine, a first gear (the generator driven gear 40) provided in the first rotating electric machine shaft, and a second gear (the motor drive gear 52) provided in the second rotating electric machine shaft, a width (the width L1) in an axial direction of the first rotating electric machine is larger than a width (the width L2) in the axial direction of the second rotating electric machine, and the number of gears provided in a shaft (the input shaft 21) in which a gear for the first rotating electric machine (the generator drive gear 32) that meshes with the first gear is arranged is smaller than the number of gears provided in a shaft (the counter shaft 27) in which a gear for the second rotating electric machine (the motor driven gear 66) that meshes with the second gear is arranged.

According to (1), a space in the axial direction can be effectively used by adjusting the number of gears provided in a peripheral shaft depending on a difference in the width in the axial direction of the first rotating electric machine and the second rotating electric machine. Therefore, the transmission can be miniaturized, thereby making it possible to miniaturize the driving device.

(2) The driving device according to (1), in which
the shaft in which the gear for the first rotating electric machine is arranged is the input shaft (the input shaft 21) to which a driving force from the internal combustion engine is inputted,
the shaft in which the gear for the second rotating electric machine is arranged is the counter shaft (the counter shaft 27) provided with an output gear (the output gear 62) that transmits the driving force from the internal combustion engine and a driving force from the second rotating electric machine to an output shaft (the axle DS),
the input shaft is provided with a first drive gear (the low speed side drive gear 34) that transmits the driving force from the internal combustion engine to the counter shaft, and
the first drive gear is arranged at a location closest to the internal combustion engine among power transmission elements provided in the input shaft.

According to (2), since the first drive gear that transmits the driving force from the internal combustion engine to the counter shaft is located at the location closest to the internal combustion engine among the power transmission elements provided in the input shaft, it is possible to prevent the input shaft from twisting.

(3) The driving device according to (2), in which
the second gear is arranged at a location closest to the second rotating electric machine among power transmission elements provided in the second rotating electric machine shaft.

According to (3), since the second gear is arranged at the location closest to the second rotating electric machine among the power transmission elements provided in the second rotating electric machine shaft, it is possible to prevent the second rotating electric machine shaft from twisting.

(4) The driving device according to (2) or (3), in which
the input shaft is further provided with a second drive gear (the high speed side drive gear 36) that transmits the driving force from the internal combustion engine to the counter shaft,
the counter shaft is further provided with a second driven gear (the high speed side driven gear 64) driven by the second drive gear,
the gears provided in the input shaft are the first drive gear, the gear for the first rotating electric machine, and the second drive gear, and
the gears provided in the counter shaft are the gear for the second rotating electric machine, the second driven gear, the output gear, and a first driven gear (the low speed side driven gear 60) driven by the first drive gear.

According to (4), since the number of gears provided in the input shaft is three and the number of gears provided in the counter shaft is four, it is possible to effectively use a space of a periphery of the second rotating electric machine having a small width in the axial direction.

(5) The driving device according to (4), in which
a first gear train (the gear train for the low speed side engine GLo) including the first drive gear and the first driven gear has a reduction ratio larger than that of a second gear train (the gear train for the high speed side engine including the second drive gear and the second driven gear.

According to (5), the driving force of the engine is transmitted to the counter shaft at a different reduction ratio between the first gear train and the second gear train, thereby improving vehicle drivability.

(6) The driving device according to (4) or (5), in which
the input shaft is further provided with a first connecting and disconnecting mechanism (the first clutch CL1) capable of connecting and disconnecting a power transmission path from the input shaft to the first drive gear,
from the side closest to the internal combustion engine, the first drive gear, the first connecting and disconnecting mechanism, the gear for the first rotating electric machine, and the second drive gear are arranged in this order in the input shaft,
a diameter (the outer diameter D1) of the gear for the first rotating electric machine is larger than a diameter (the outer diameter Dc) of the first connecting and disconnecting mechanism, and
the gear for the first rotating electric machine and the first connecting and disconnecting mechanism partially overlap each other in the axial direction.

According to (6), since the gear for the first rotating electric machine and the first connecting and disconnecting mechanism partially overlap each other in the axial direction, it is possible to further miniaturize the driving device in the axial direction.

(7) The driving device according to any one of (4) to (6), in which
the counter shaft is further provided with a second connecting and disconnecting mechanism (the second clutch CL2) capable of connecting and disconnecting a power transmission path from the second driven gear to the counter shaft According to (7), the second connecting and disconnecting mechanism connects and disconnects the power transmission path from the second driven gear to the counter shaft, and requires less clutch capacity than the one that connects and disconnects a power transmission path from the input shaft to the second drive gear.

(8) The driving device according to any one of (2) to (7), in which
the gear for the second rotating electric machine is arranged at a location closest to the second rotating electric machine among power transmission elements provided in the counter shaft, and overlaps the first rotating electric machine in the axial direction.

According to (8), since the gear for the second rotating electric machine is arranged at the location closest to the second rotating electric machine among the power transmission elements provided in the counter shaft, and overlaps the first rotating electric machine in the axial direction, it is possible to further miniaturize the driving device in the axial direction.

(9) A driving device (the driving device 10) including:
an internal combustion engine (the engine ENG);
a first rotating electric machine (the generator GEN);
a second rotating electric machine (the motor MOT); and
a transmission (the transmission T), in which
the transmission includes
an input shaft (the input shaft 21) to which a driving force from the internal combustion engine is inputted,
a differential device (the differential mechanism D) connected to an output shaft (the axle DS),
a counter shaft (the counter shaft 27) that transmits the driving force from the internal combustion engine and a driving force from the second rotating electric machine to the differential device,
a first rotating electric machine shaft (the generator shaft 23) which is a rotating shaft of the first rotating electric machine, and
a second rotating electric machine shaft (the motor shaft 25) which is a rotating shaft of the second rotating electric machine, the input shaft, the counter shaft, the first rotating electric machine shaft, the second rotating electric machine shaft, and the output shaft are arranged in parallel to each other, and when viewed from an axial direction, a shaft center of the input shaft (the input shaft center 21c) and a shaft center of the counter shaft (the counter shaft center 27c) are arranged in a virtual triangle formed by connecting a shaft center of the first rotating electric machine shaft (the generator shaft center 23c), a shaft center of the second rotating electric machine shaft (the motor shaft center 25c), and a shaft center of the output shaft (the axle center DSc).

According to (9), since, when viewed from the axial direction, the shaft center of the input shaft and the shaft center of the counter shaft are arranged in the virtual triangle formed by connecting the shaft center of the first rotating electric machine shaft, the shaft center of the second rotating electric machine shaft, and the shaft center of the output shaft, it is possible to miniaturize the transmission, and to miniaturize the driving device when viewed from the axial direction.

(10) The driving device according to (9), in which
when viewed from the axial direction, the shaft center of the second rotating electric machine is located closer to the shaft center side of the output shaft than the shaft center of the first rotating electric machine, and is located closer to the shaft center side of the first rotating electric machine than the shaft center of the output shaft, and a part of the second rotating electric machine is located below a virtual line (the virtual line LN) formed by connecting an uppermost portion of the first rotating electric machine and an uppermost portion of the differential device.

According to (10), since, when viewed from the axial direction, the shaft center of the second rotating electric machine is located between the shaft center of the first rotating electric machine and the shaft center of the output shaft, and the second rotating electric machine overlaps the first rotating electric machine and the differential device in the height direction, a height dimension of the driving device can be reduced.

(11) The driving device according to (9) or (10), in which
the input shaft includes:
a first drive gear (the low speed side drive gear 34) that transmits the driving force from the internal combustion engine to the counter shaft; and
a gear for the first rotating electric machine (the generator drive gear 32) that is provided in the input shaft, and transmits the driving force from the internal combustion engine to the first rotating electric machine shaft,
the counter shaft includes
a first driven gear (the low speed side driven gear 60) driven by the first drive gear,
a gear for the second rotating electric machine (the motor driven gear 66) that is driven by the driving force from the second rotating electric machine; and
an output gear (the output gear 62) that transmits the driving force from the internal combustion engine and the driving force from the second rotating electric machine to the output shaft,
the first drive gear and the gear for the first rotating electric machine partially overlap the first rotating electric machine when viewed in the axial direction, and
the first driven gear, the gear for the second rotating electric machine, and the output gear partially overlap the second rotating electric machine when viewed from the axial direction.

According to (11), since the first drive gear and the gear for the first rotating electric machine provided in the input shaft partially overlap the first rotating electric machine, and the first driven gear, the gear for the second rotating electric machine, and the output gear provided in the counter shaft partially overlap the second rotating electric machine, it is possible to further miniaturize the driving device when viewed from the axial direction.

(12) The driving device according to (11), in which
the first drive gear and the gear for the first rotating electric machine partially overlap the first rotating electric machine and the second rotating electric machine when viewed from the axial direction.

According to (12), since the first drive gear and the gear for the first rotating electric machine provided in the input shaft partially overlap the first rotating electric machine and the second rotating electric machine, it is possible to further miniaturize the driving device when viewed from the axial direction.

The invention claimed is:
1. A driving device for a vehicle, comprising:
an internal combustion engine;
a first rotating electric machine;
a second rotating electric machine; and
a transmission, wherein:
the transmission includes:
a first rotating electric machine shaft which is a rotating shaft of the first rotating electric machine;
a second rotating electric machine shaft which is arranged in parallel to the first rotating electric machine shaft and is a rotating shaft of the second rotating electric machine;
a first gear provided in the first rotating electric machine shaft; and
a second gear provided in the second rotating electric machine shaft;
a width in an axial direction of the first rotating electric machine is larger than a width in the axial direction of the second rotating electric machine;
the number of gears provided in a shaft in which a gear for the first rotating electric machine that meshes with the first gear is arranged is smaller than the number of gears provided in a shaft in which a gear for the second rotating electric machine that meshes with the second gear is arranged;
the shaft in which the gear for the first rotating electric machine is arranged is the input shaft to which a driving force from the internal combustion engine is inputted;
the shaft in which the gear for the second rotating electric machine is arranged is the counter shaft provided with an output gear that transmits the driving force from the internal combustion engine and a driving force from the second rotating electric machine to an output shaft;
the input shaft is provided with a first drive gear that transmits the driving force from the internal combustion engine to the counter shaft; and
the first drive gear is arranged at a location closest to the internal combustion engine among power transmission elements provided in the input shaft.
2. The driving device according to claim 1, wherein
the second gear is arranged at a location closest to the second rotating electric machine among power transmission elements provided in the second rotating electric machine shaft.

3. The driving device according to claim 1, wherein:
the input shaft is further provided with a second drive gear that transmits the driving force from the internal combustion engine to the counter shaft;
the counter shaft is further provided with a second driven gear driven by the second drive gear;
the gears provided in the input shaft are the first drive gear, the gear for the first rotating electric machine, and the second drive gear; and
the gears provided in the counter shaft are the gear for the second rotating electric machine, the second driven gear, the output gear, and a first driven gear driven by the first drive gear.

4. The driving device according to claim 3, wherein a first gear train including the first drive gear and the first driven gear has a reduction ratio larger than that of a second gear train including the second drive gear and the second driven gear.

5. The driving device according to claim 3, wherein:
the input shaft is further provided with a first connecting and disconnecting mechanism capable of connecting and disconnecting a power transmission path from the input shaft to the first drive gear;
from the side closest to the internal combustion engine, the first drive gear, the first connecting and disconnecting mechanism, the gear for the first rotating electric machine, and the second drive gear are arranged in this order in the input shaft;
a diameter of the gear for the first rotating electric machine is larger than a diameter of the first connecting and disconnecting mechanism; and
the gear for the first rotating electric machine and the first connecting and disconnecting mechanism partially overlap each other in the axial direction.

6. The driving device according to claim 3, wherein the counter shaft is further provided with a second connecting and disconnecting mechanism capable of connecting and disconnecting a power transmission path from the second driven gear to the counter shaft.

7. The driving device according to claim 1, wherein the gear for the second rotating electric machine is arranged at a location closest to the second rotating electric machine among power transmission elements provided in the counter shaft, and overlaps the first rotating electric machine in the axial direction.

8. A driving device comprising:
an internal combustion engine;
a first rotating electric machine;
a second rotating electric machine; and
a transmission, wherein:
the transmission includes:
  an input shaft to which a driving force from the internal combustion engine is inputted;
  a differential device connected to an output shaft;
  a counter shaft that transmits the driving force from the internal combustion engine and a driving force from the second rotating electric machine to the differential device;
  a first rotating electric machine shaft which is a rotating shaft of the first rotating electric machine; and
  a second rotating electric machine shaft which is a rotating shaft of the second rotating electric machine;
the input shaft, the counter shaft, the first rotating electric machine shaft, the second rotating electric machine shaft, and the output shaft are arranged in parallel to each other; and
when viewed from an axial direction, a shaft center of the input shaft and a shaft center of the counter shaft are arranged in a virtual triangle formed by connecting a shaft center of the first rotating electric machine shaft, a shaft center of the second rotating electric machine shaft, and a shaft center of the output shaft.

9. The driving device according to claim 8, wherein:
when viewed from the axial direction, the shaft center of the second rotating electric machine is located closer to the shaft center side of the output shaft than the shaft center of the first rotating electric machine, and is located closer to the shaft center side of the first rotating electric machine than the shaft center of the output shaft; and
a part of the second rotating electric machine is located below a virtual line formed by connecting an uppermost portion of the first rotating electric machine and an uppermost portion of the differential device.

10. The driving device according to claim 8, wherein:
the input shaft includes:
  a first drive gear that transmits the driving force from the internal combustion engine to the counter shaft; and
  a gear for the first rotating electric machine that is provided in the input shaft, and transmits the driving force from the internal combustion engine to the first rotating electric machine shaft;
the counter shaft includes:
  a first driven gear driven by the first drive gear;
  a gear for the second rotating electric machine that is driven by the driving force from the second rotating electric machine; and
  an output gear that transmits the driving force from the internal combustion engine and the driving force from the second rotating electric machine to the output shaft;
the first drive gear and the gear for the first rotating electric machine partially overlap the first rotating electric machine when viewed in the axial direction; and
the first driven gear, the gear for the second rotating electric machine, and the output gear partially overlap the second rotating electric machine when viewed from the axial direction.

11. The driving device according to claim 10, wherein the first drive gear and the gear for the first rotating electric machine partially overlap the first rotating electric machine and the second rotating electric machine when viewed from the axial direction.

* * * * *